United States Patent [19]
Ninomiya

[11] Patent Number: 5,325,039
[45] Date of Patent: Jun. 28, 1994

[54] METHOD AND APPARATUS FOR CONTROLLING POWER SUPPLY

[75] Inventor: Ryozi Ninomiya, Tokyo, Japan
[73] Assignee: Kabushiki Kaisha Toshiba, Kawasaki, Japan
[21] Appl. No.: 784,714
[22] Filed: Oct. 30, 1991
[30] Foreign Application Priority Data
 Nov. 7, 1990 [JP] Japan ................... 2-301687
[51] Int. Cl.⁵ .................................................. H02J 7/10
[52] U.S. Cl. ....................................... 320/22; 320/39
[58] Field of Search ........................... 522/22-24, 522/39, 46, DIG. 2

[56] References Cited

U.S. PATENT DOCUMENTS

| | | | |
|---|---|---|---|
| 3,766,463 | 10/1973 | Ruben | 320/39 X |
| 4,031,451 | 6/1977 | Gordon | 320/39 X |
| 4,131,841 | 12/1978 | Bennefeld | 320/39 X |
| 4,291,266 | 9/1981 | Portmann | 320/21 X |
| 4,422,032 | 12/1983 | Kakumoto et al. | 320/39 |
| 4,716,354 | 12/1987 | Hacker | 320/39 |
| 4,730,121 | 3/1988 | Lee et al. | 307/66 |
| 4,754,160 | 6/1988 | Ely | 307/64 |

FOREIGN PATENT DOCUMENTS 0005841 12/1979 European Pat. Off. .
0368353 5/1990 European Pat. Off. .

*Primary Examiner*—R. J. Hickey
*Attorney, Agent, or Firm*—Oblon, Spivak, McClelland, Maier & Neustadt

[57] ABSTRACT

When an AC adapter and a battery are connected to a system, trickle charge is performed with respect to the battery through a trickle charge resistor. During the trickle charging of the battery, the adapter voltage of the AC adapter and the battery voltage of the battery are detected by voltage detectors, respectively. On the basis of a differential voltage representing a difference between the two detected voltages, a power source controller controls the start and stop of the trickle charge at predetermined timings in such a manner that a trickle charge current does not exceed a predetermined value even when the differential voltage increases.

16 Claims, 6 Drawing Sheets

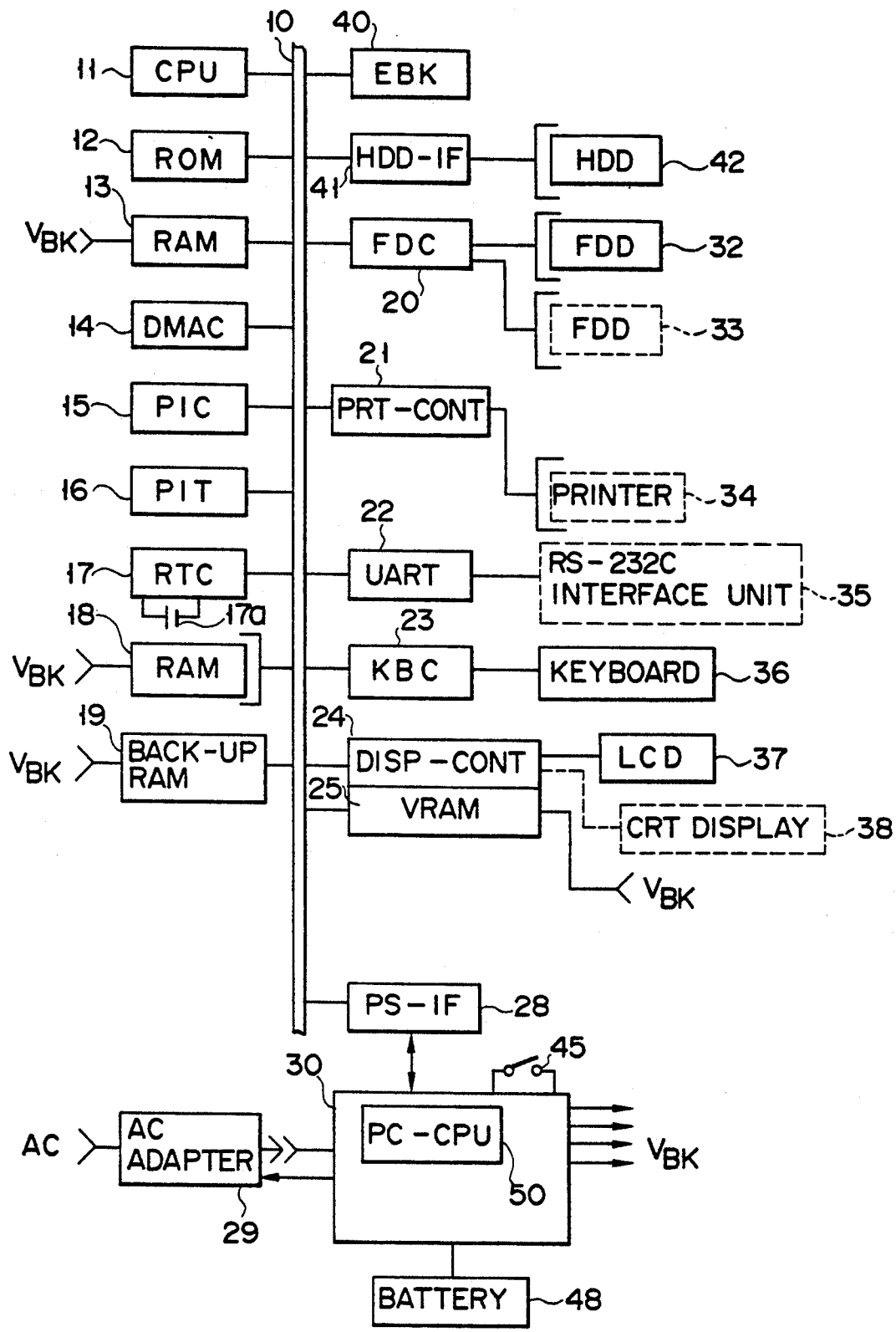
F I G. 1

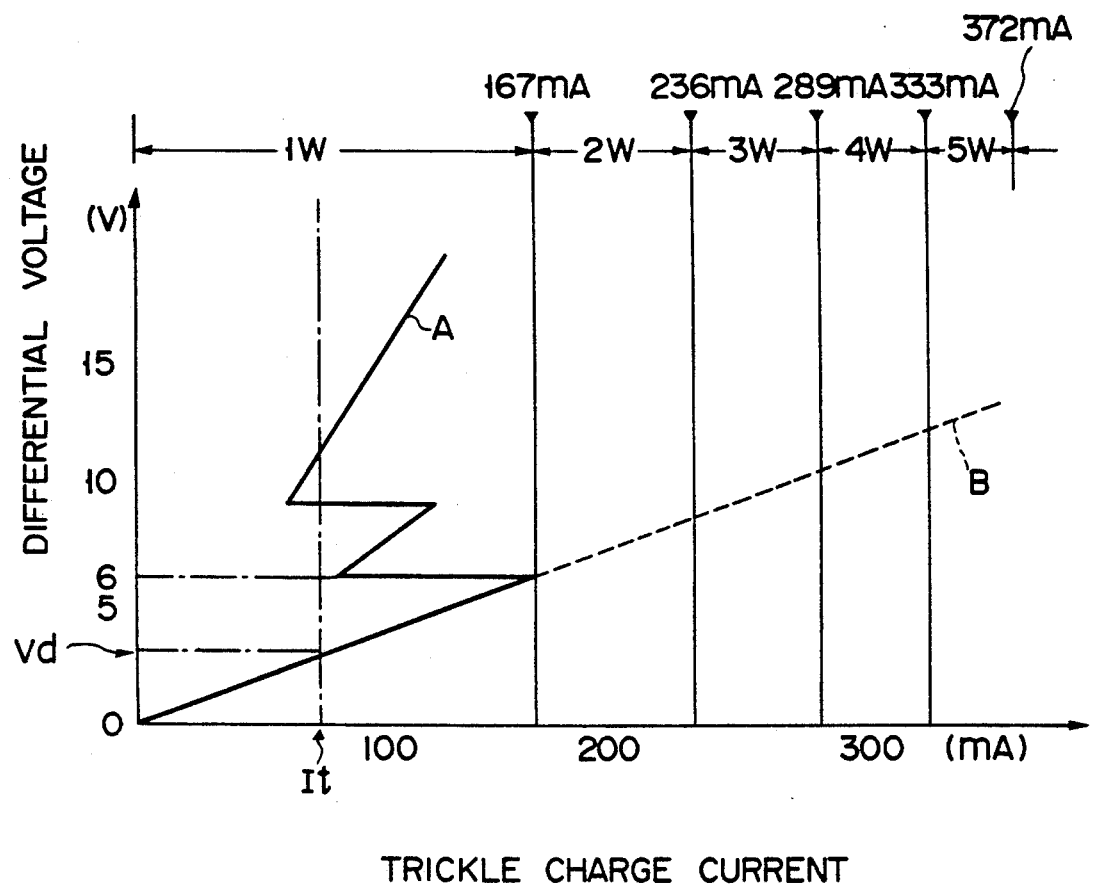
F I G. 3

| COUNT VALUE | DUTY REGISTER VALUE |
|---|---|
| 0 | 0 0 1 1 → "3" |
| 1 | 1 0 0 1 |
| 2 | 1 1 0 0 |
| 3 | 0 1 1 0 |

METHOD AND APPARATUS FOR CONTROLLING POWER SUPPLY

BACKGROUND OF THE INVENTION

1. Field of the Invention

The present invention relates to a method and apparatus for controlling power supply.

2. Description of the Related Art

In general, many electronic apparatuses, such as lap-top personal computers or word processors, are operated by an AC adapter and/or an incorporated chargeable battery. The battery is charged, with a current (i.e., a charge current) supplied from the AC adapter. Even after the battery is in the full charge state, The battery charge is performed by supplying a trickle charge current, the amount of which is smaller than that of the normal charge current. This battery charge is generally referred to as "trickle charge." For the trickle charge, a fixed resistor having a constant resistance is used, and the trickle charge current is supplied through this resistor to the battery. In general, the trickle charge current supplied to the battery is about ⅓ of the capacity of the battery. When the battery has a capacity of 2,100 mAh, the trickle charge current is about 70 mA.

In this type of electronic apparatus, a diode for preventing back flow of a charge current and a fixed resistor for controlling a trickle charge current are arranged between an AC adapter and a battery, and the trickle charge is performed when the AC adapter is electrically connected to the electronic apparatus. In the case where the operating voltage of the electronic apparatus is high, it is likely that the battery will be in an over discharge state. Even then the battery voltage of the battery becomes 0 V, the elements located around the trickle charge resistor must not be adversely affected by the heat which the resistor generates. Therefore, the wattage of the resistor has to be as large as possible. However, a resistor having a large wattage is inevitably large in size, and is not suitable for incorporation in an electronic apparatus which should be small in size and light in weight, like a lap-top type personal computer.

Under the circumstances mentioned above, there is a demand for a power source control apparatus which controls a trickle charge current such that the trickle charge can be efficiently performed by use of a small-sized and small-wattage resistor element.

SUMMARY OF THE INVENTION

Accordingly, an object of the present invention is to provide a method and apparatus for controlling power supply.

According to one aspect of the present invention, there is provided a power supply controlling apparatus comprising: a battery being chargeable; supply means for supplying a trickle charge current to the battery; and control means for sampling voltages of the battery and the supply means at predetermined times during trickle charge of the battery and for causing the supply means to stop supply of the trickle charge current to the battery in accordance with a differential voltage value representing a difference between the sampled voltages.

According to another aspect of the present invention, there is provided a power supply controlling method comprising the steps of: determining whether or not a battery is incorporated and whether or not an adapter for supplying a trickle charge current is connected, the battery being chargeable; starting trickle charge of the battery when the battery is incorporated and the adapter is connected; sampling voltages of the battery and the adapter at predetermined time during the trickle charge of the battery; and causing the adapter to stop supply of the trickle charge current to the battery in accordance with a differential voltage representing a difference between the sampled voltages.

The accompanying drawing, which is incorporated in and constitutes a part of the specification, illustrates a presently preferred embodiment of the invention and, together with the general description given above and the detailed description of the preferred embodiment given below, serves to explain the principles of the invention.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block circuit diagram showing a computer system used in an embodiment of the present invention;

FIG. 3 is a graph explaining a change of a trickle charge current during the trickle charge according to the present invention and during the trickle charge according to the conventional case;

DETAILED DESCRIPTION OF THE PREFERRED EMBODIMENTS

Figure 2:
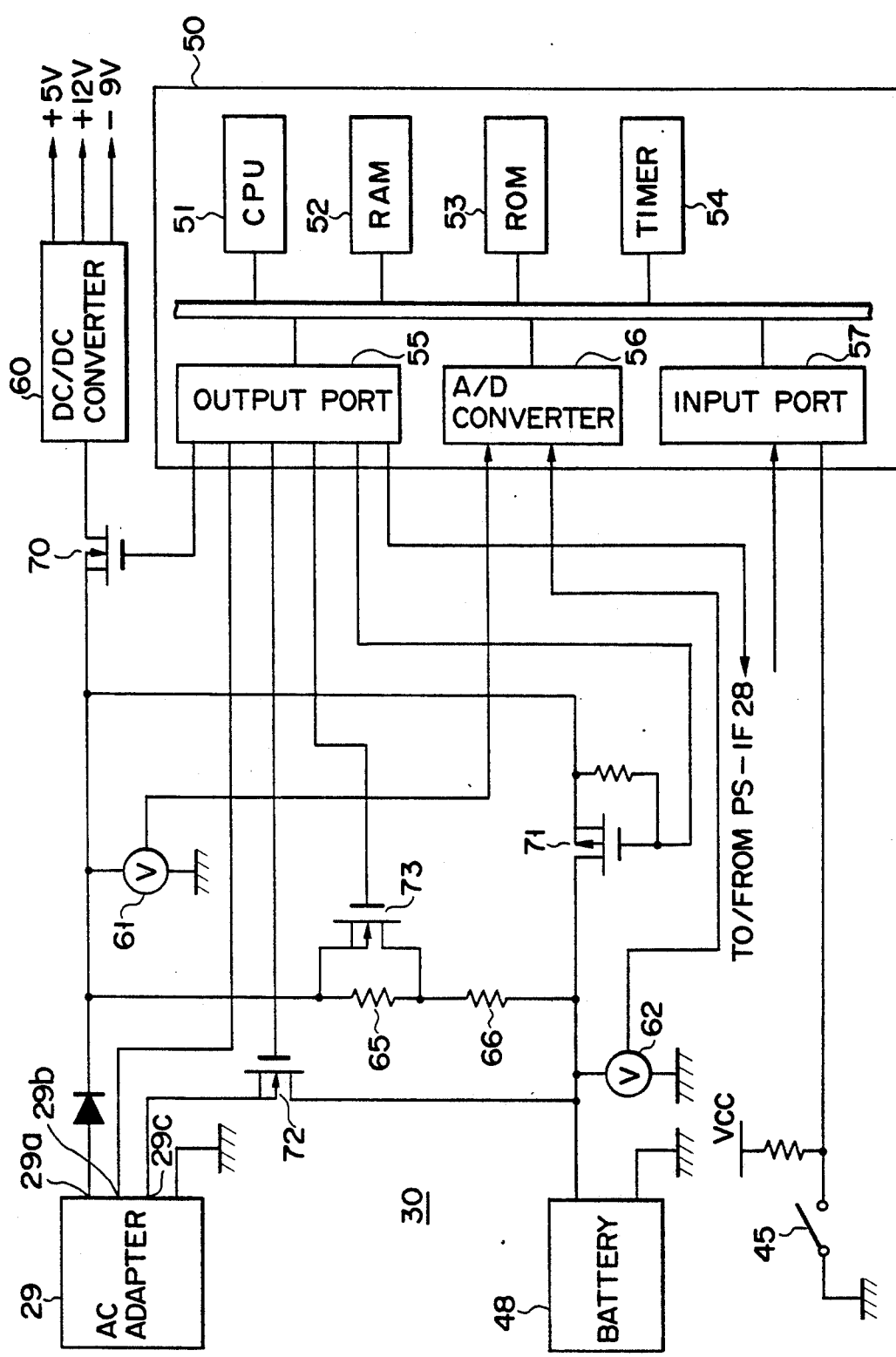
FIG. 2 is a block circuit diagram showing a power source circuit used in the embodiment of the present invention.

A preferred embodiment of the present invention will now be described referring to the accompanying drawings.

FIG. 1 shows a block diagram illustrating the configuration of a computer system used in one embodiment of the present invention. As shown in FIG. 1, this computer system comprises a system bus 10, a main CPU (Central Processing Unit) 11 for controlling the entire system, a ROM (Read Only Memory) 12 for storing a control program inherent to the system, etc., a RAM (Random Access Memory) 13, a direct memory access controller (DMAC) 14 for performing the direct memory access control, a programmable interrupt controller (PIC) 15 settable by a program, a programmable interval timer (PIT) 16 settable by a program, a real time clock (RTC) 17 as a timer module with a drive battery 17a, an expansion RAM 18 with a large capacity and connectable to a special card slot, and a backup RAM 19 for storing backup data, etc. to implement a resume function.

The computer system also includes a floppy disk controller (FDC) 20. Floppy disk drives (FDDs) 32 and 33 are connected to the floppy disk controller 20 which controls these disk drives.

Further, the computer system comprises a printer controller (PRT-CONT) 21, a universal asynchronous receiver/transmitter (UART) 22 as an input/output interface, a keyboard controller (KBC) 23, a display controller (DISP-CONT) 24, a video RAM (VRAM) 25, a power supply interface (PS-IF) 28, an AC adapter 29, a power supply circuit 30 having a power controller (PC-CPU) 50, a keyboard 36, an LCD (Liquid Crystal Display) 37, an expansion bus connector (EBC) 40, a hard disk drive interface (HDD-IF) 41, a hard disk drive (HDD) 42, a power supply switch 45, and a battery 48.

A printer 34 or the like is selectively connected to the printer controller 21. An RS-232C interface unit 35 is connected to the universal asynchronous receiver/transmitter 22 as needed. The keyboard controller 23 controls a key input through the keyboard 36.

The display controller 24 controls the LCD 37 which is attached swingable to the computer body, or a CRT (Cathode Ray Tube) display 38 which is selectively connected to the computer.

The power supply interface 28 receives and transfers serial data from and to the power supply controller 50 in the power supply circuit 30.

The AC adapter 29, connectable to the computer system, is connected to an external power supply (not shown), and rectifies/smooths an AC voltage from the external power supply to output a DC voltage. If the AC adapter 29 is connected to the computer system to activate the system, the voltage is supplied from the AC adapter 29 through the power supply circuit 30 to each component of the computer system.

A backup voltage $V_{BK}$ is supplied to each of the RAMs 13 and 18, the backup RAM 19 and the VRAM 25.

The expansion bus connector 40 is used for functional expansion of the system. For example, an external hard disk drive is selectively connected to the expansion bus connector 40. An expansion unit (not shown) having various components, such as a keyboard, a CRT display, a memory, a connector to the body of the computer system, can also be selectively connected to the expansion bus connector 40.

The power supply switch 45 is used to activate this computer system, and has a momentary switch. When the DC voltage is not yet supplied to the individual components from the power supply circuit 30, or when the power supply is off, depression of the power supply switch 45 activates the power supply. When the DC voltage is supplied to the individual components from the power supply circuit 30 and the system is operated, or when the power supply is on, depression of the power supply switch 45 deactivates the power supply.

The battery 48 can be recharged or rapidly charged and built in the computer system. If the AC adapter 29 is not connected to the computer system and the battery 48 is built therein instead, a DC voltage is supplied from the battery 48 through the power supply circuit 30 to the individual components of the computer system in order to activate the computer system. A nickel-hydrogen battery is used as the battery 48, for example.

FIG. 2 is a graph showing the charging characteristic in the battery 48 being charged rapidly. In FIG. 2, the axis of ordinates represents the battery voltage of the battery 48, the axis of abscissas represents the charge time of the battery 48. The battery 48 has such a charging characteristic as shown in FIG. 2. That is, the battery voltage per unit charge time greatly increases near the full charge state (battery voltage: approximately 18.5 V, charge time: approximately 60 minutes).

The power supply circuit 30 will now be described. FIG. 3 is a structural block diagram illustrating the power supply circuit according to the embodiment of the prevent invention. The power supply circuit 30 includes the power supply controller 50, a DC/DC converter 60, voltage detectors 61 and 62, resistors 65 and 66, and FET switches 70, 71, 72 and 73.

The AC adapter 29 has a constant-voltage output terminal 29a, a control-signal input terminal 29b, and a constant-current output terminal 29c. A constant voltage of 18 V is output from the constant-voltage output terminal 29a. A constant current of 2.2A is output from the constant-current output terminal 29c. A control signal from the power supply controller 50 is supplied to the control signal input terminal 29b. In response to the control signal, the AC adapter 29 outputs either the constant voltage or constant current.

The DC/DC converter 60 generates a DC voltage of a predetermined level based on the DC voltage supplied from either the AC adapter 29 or the battery 48, and supplies the generated DC voltage of the predetermined level to the individual components of the computer system. Since the DC voltage from the AC adapter 29 or the battery 48 is 18 V, DC voltages of +5 V, +12 V and −9 V are actually supplied to predetermined components.

The voltage detector 61 detects an adapter voltage of the AC adapter 29, i.e., the constant voltage output from the constant-voltage output terminal 29a. The voltage detector 62 detects the battery voltage of the battery 48. Based on these detected voltages, it is determined whether the AC adapter 29 or the battery 48 is connected to the computer system.

The FET switch 70 is used to supply or stop supplying the DC voltage to the DC/DC converter 60 from the AC adapter 29 or the battery 48. When the FET switch 70 is on, the DC voltage is supplied to the DC/DC converter 60. Therefore, the DC/DC converter 60 can supply the above-described voltage of the predetermined level to each component.

The FET switch 71 is used to supply the DC voltage from the battery 48 through the FET switch 70 to the DC/DC converter 60. When the FET switch 71 is turned on, the DC voltage can be supplied to the DC/DC converter 60 from the battery 48.

The FET switch 72 is utilized to supply the constant current from the constant-current output terminal 29c of the AC adapter 29 to the battery 48. When the FET switch 72 is on, the constant current is supplied to the battery 48 for rapid charge.

The FET switch 73 is used to supply the constant voltage from the constant-voltage output terminal 29a of the Ac adapter 29 to the battery 48. When the FET switch 73 is on, the constant voltage is supplied to the battery 48 through the resistor 66 for trickle charge.

The trickle charge represents that a rechargeable battery, even after fully charged by an AC adapter, continues to be charged all the time with a current smaller than a charge current.

The resistor 65 as a current limiting resistor, used to inhibit supplying of a large current to the battery 48, has usually a high resistance.

The resistor 66, used for trickle charge, has usually a low resistance, for example, several tens $\Omega$.

The power supply controller 50 has a CPU 51, a RAM 52, a ROM 53, a timer 54, an output port 55, an A/D converter 56 and an input port 57.

The CPU 51, constituted by one chip, controls a voltage supply to the individual component, and rapid charge/trickle charge to the battery 48. In the present invention, the trickle charge is executed.

The ROM 53 stores control programs, etc. to be used for the voltage supply control and the rapid charge/trickle charge control.

The RAM 52 is used as the main memory of the CPU 51. Assigned to the RAM 52 are various memory areas, as a flag, a counter and the like, used to the voltage supply control and the rapid charge/trickle charge control. In this embodiment, part of RAM 52 is used as a duty register, a timer interruption flag, and a counter, as described later.

The timer 54 outputs a timer value to the CPU 51 by a predetermined cycle. In the embodiment, the timer value is utilized for executing the trickle charge control every predetermined time, e.g., 65 ms.

The output port 55 outputs a control signal individually to the control-signal input terminal 29b of the AC adapter 29, and the FET switches 70, 71, 72 and 73, and transmits data to the power supply interface 28. In response to the control signal at the control-signal input terminal 29b, the AC adapter 29 outputs the constant current or the constant voltage. The FET switches 70, 71, 72 and 73 are turned on or off depending on the received control signals at each FET switch. To control the charging of the battery 48, a control signal used to turn on/off the FET switch 72 is output from the output port 55.

The A/D converter 56 converts analog voltages output respectively from the voltage detectors 61 and 62 into digital voltages.

The input port 57 receives a signal indicating whether the power supply switch 45 is depressed. As shown in FIG. 3, the level of a voltage to the input port 57 is Vcc as long as the power supply switch 45 is not depressed. Since the power supply switch 45 is a momentary switch as described above, however, the level of the received voltage at the input port 57 is "0" during a predetermined period of time upon each depression of the power supply switch 45. By detecting a change in voltage level, therefore, it can be determined whether the power supply switch 45 is depressed.

A description will now be given, with reference to the flowcharts shown in FIG. 3, FIGS. 4A and 4B and FIG. 5, in the trickle charge control for the battery 48 in the CPU 51 of the power supply controller 50.

FIG. 3 is a graph explaining a change of a trickle charge current during the trickle charge according to the present invention and during the trickle charge according to the conventional case. In FIG. 3, the axis of ordinates represents a differential voltage representing a difference between the voltage of the AC adapter 29 and the battery voltage of the battery 48, and the axis of abscissas represents a trickle charge current. Symbol "It" denotes a desirable trickle charge current value, symbol "vd" denotes a differential voltage (about 3 V) in a normal operating state, and the "1W, 2W, . . . " denote the wattage of the trickle charge resistor. The wattage indicated in FIG. 3 is a value necessary to prevent the elements located around the resistor from being adversely affected by heat produced during the trickle charge current flows into the resistor. For example, when the trickle charge current is 200 mA, the trickle charge resistor must have a wattage equal to or larger than 2W. If the resistor has a wattage smaller than 2W, the elements located around the resistor will be adversely affected by the heat produced in the resistor. In FIG. 3, linear line B including solid and broken lines represents a change of the trickle charge current during the trickle charge according to the conventional case, and bent line A as a solid line) represents a change of the trickle charge current during the trickle charge according to the present invention.

Figure 4A:
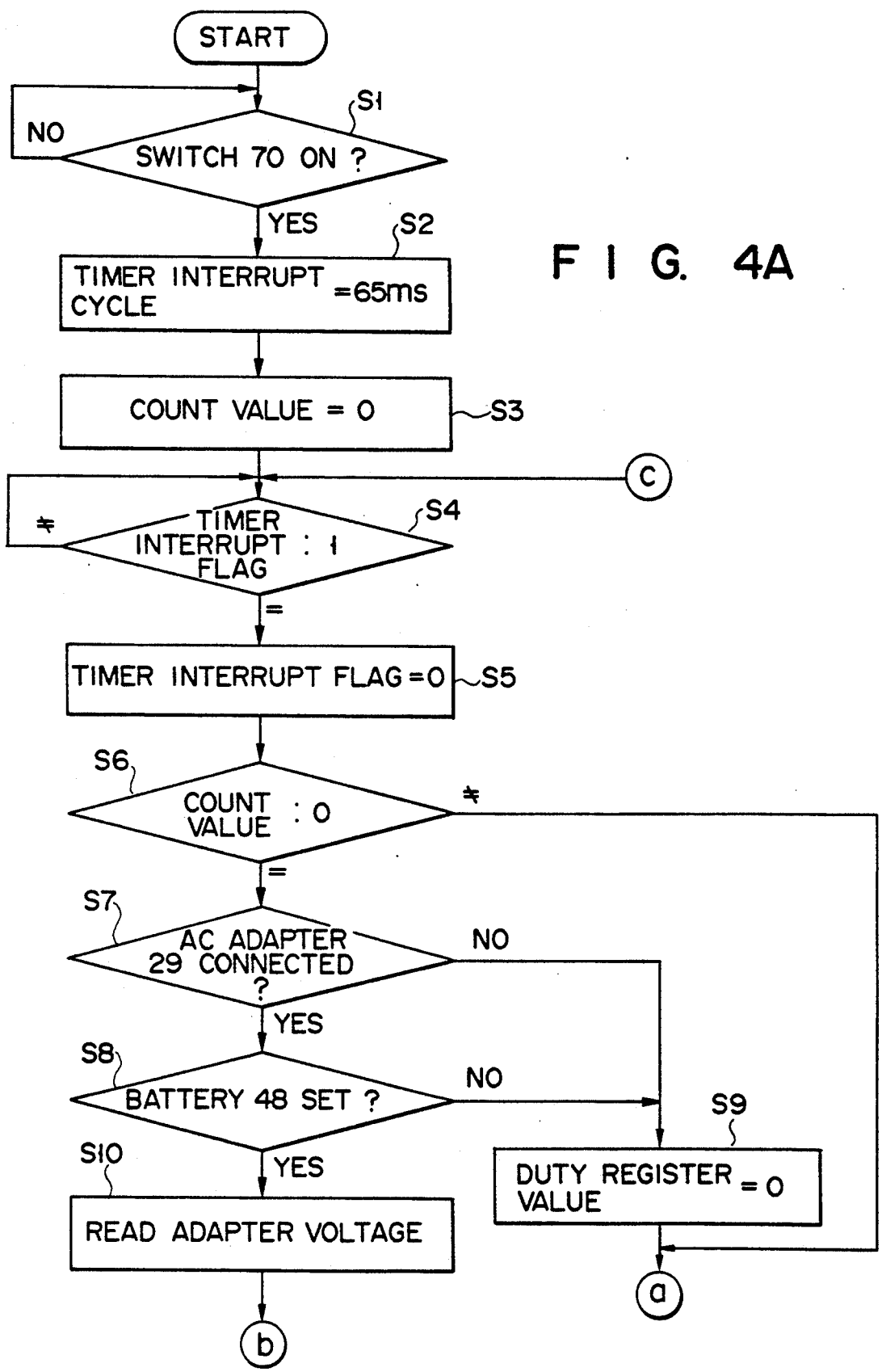
FIGS. 4A and 4B are flowcharts of the trickle charge control in a CPU of a power source controller according to the embodiment.
Figure 4B:
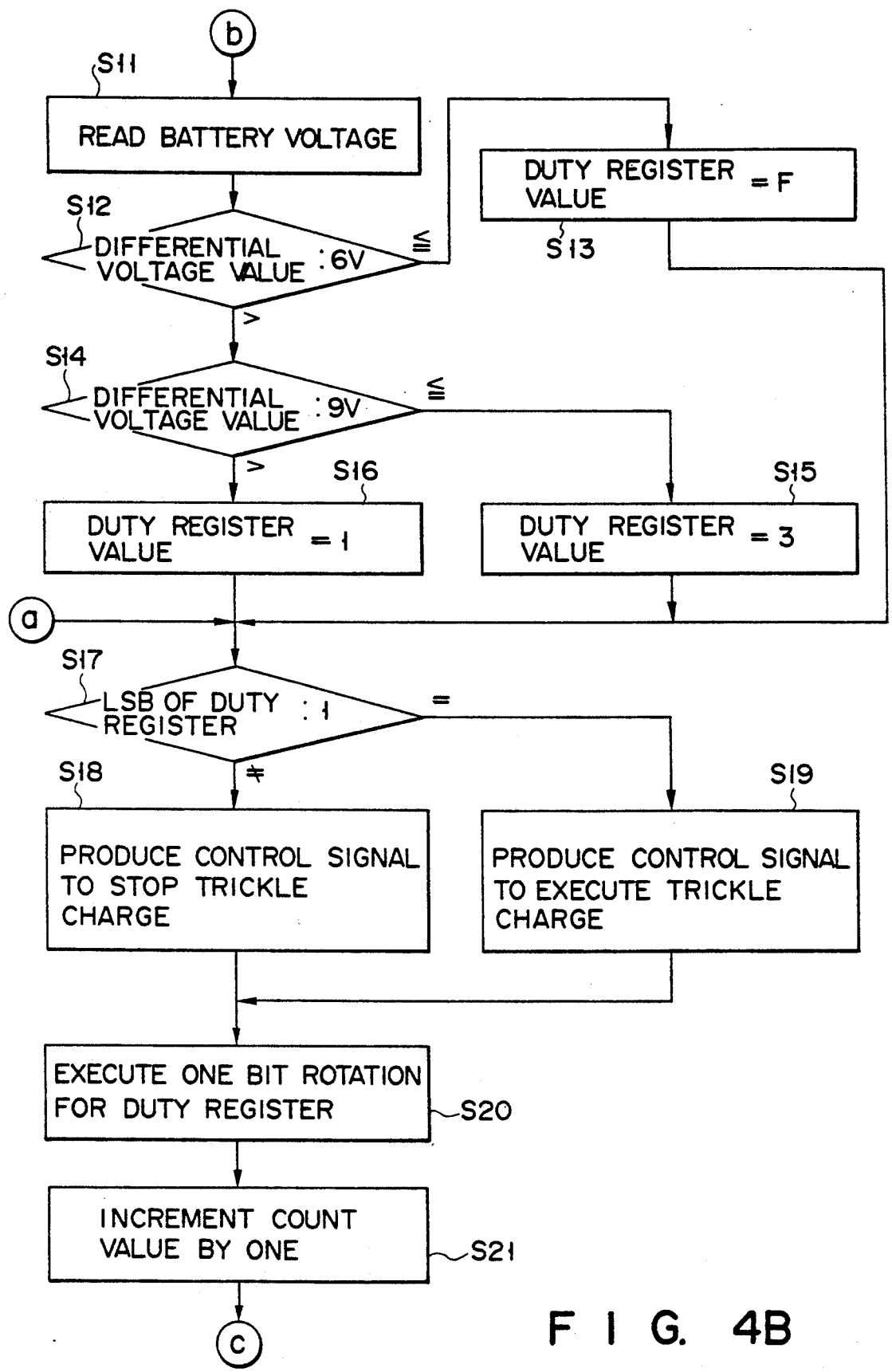
Figures 5, 6:
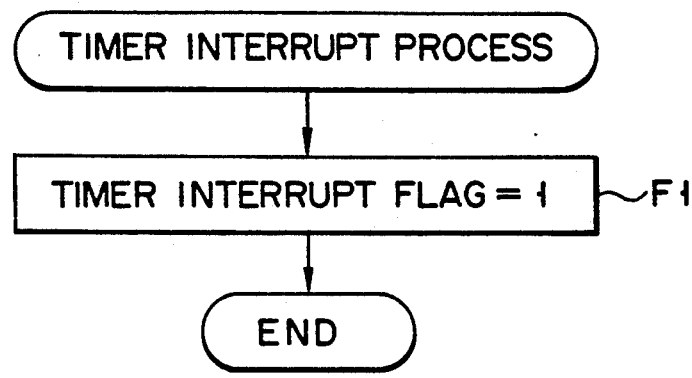
FIG. 5 is a flowchart of timer interrupt processing in the CPU of the power source controller according to the embodiment.
FIG. 6 is a diagram explaining a change of a count value and a duty register value during the trickle charge control.

FIGS. 4A and 4B are flowcharts showing the trickle charge control performed by the CPU 51 of the power source controller 50, and FIG. 5 is a flowchart showing the timer interruption processing executed by the CPU 51.

The CPU 51 of the power supply controller 50 executes the trickle charge control program stored in ROM 53. The timer interruption processing is performed by the timer interruption cycle set by the execution of the trickle charge control program.

In the trickle charge control, contents of a memory area in the RAM 52 assigned as a flag area are referred to. A timer interrupt flag indicates whether or not the trickle charge control is executed. As will be described later, the timer interruption processing is executed every the predetermined time of 65 ms, and the timer interrupt flag is set to be "1" in each timer interruption processing. In other words, the trickle charge control is executed every 65 ms.

Also, a count value corresponding to a content of memory area in the RAM 52 assigned as a counter is referred to. The count value of the counter is one of "0," "1," "2" and "3." The count value is repeatedly counted up in the order of "0," "1," "2" and "3." The count value is incremented by 1 every 65 ms. Therefore, an execution period of the trickle charge is set every a period of 260 ms (65 ms×4).

Further, contents of a memory area in RAM 52 assigned as the register are referred to. A duty register is a 4 bit register representing an execution period of the trickle charge every the period of 260 ms. When the register value (in a hexadecimal number) of the duty register is "0" (corresponding to "0000" in a binary number), no trickle charge is executed during the period of 260 ms. When the register value of the duty register is "1" (corresponding to "0001" in a binary number), the trickle charge is executed for about 65 ms from the start of the period of 260 ms. When the register value of the duty register is "3" (corresponding to "0011" in a binary number), the trickle charge is executed for about 130 ms (65 ms×2) from the start of the period of 260 ms. When the register value of the duty register is "F" (corresponding to "1111" in a binary number), the trickle charge is executed during the period of 260 ms.

In step S1, it is determined whether or not the FET switch 70 is on, i.e., whether or not a voltage is supplied to each component of the computer system by either the AD adapter 29 or the battery 48. If the FET switch 70 is on, the timer interrupt cycle is set to be 65 ms, for example, in step S2. Further, in step S3, the count value of the counter is set to be "0."

In step S4, it is determined whether or not the timer interrupt flag is "1." Since the timer interrupt cycle is set to be 65 ms in step S2, the timer interruption processing shown in FIG. 5 is executed every the period of 65 ms. In the timer interruption processing, the timer interrupt flag is set to be "1" in step F1. Therefore, the processing step S4 and subsequent steps are not carried out until the processing of step F1 is executed.

In step S4, if the timer interrupt flag is "1," the timer interrupt flag is set to be "0" in step S5. In subsequent step S6, it is determined whether or not the count value of the counter is "0."

In step S6, if the count value of the counter is "0," it is determined that the present time corresponds to the start time of the period of 260 ms. Hence, processes of steps 7-16 are executed so as to set the execution period of the trickle charge.

In step S7, it is determined whether or not the AC adapter 29 is connected to the computer system. In step S8, it is determined whether or not the battery 48 is incorporated in the computer system.

If the AC adapter 29 is not connected to the computer system in step S7 or if the battery 48 is not incorporated in the computer system in step S8, the duty register value of the duty register is set to be "0" (step S9). That is, the trickle charge is not performed.

If the AC adapter 29 is connected to the computer system and the battery 48 is incorporated therein, it is determined that trickle charge can be started. In step S10, an adapter voltage value representing the adapter voltage of the AC adapter 29 output from the voltage detector 61 to the A/D converter 56 is read. In step S11, a battery voltage value representing the battery voltage of the battery 48 output from the voltage detector 62 to the A/D converter 56 is read.

In step S12, a differential voltage value representing a difference between the adapter voltage value and the battery voltage value (adapter voltage value—battery voltage value) is compared with a reference voltage value of e.g., 6 V. As is seen from FIG. 3, the reference voltage value of 6 V corresponds to the upper limit value of the trickle charge resistor which a wattage is 1.

If the differential voltage value is equal to or smaller than 6 V in step S12, the duty register value is set to be "F," i.e., "1111" in step S13. This represents that the trickle charge is executed during the period of 260 ms.

If the differential voltage value is larger than 6 V in step S12, it is determined whether or not the differential voltage value is larger than 9 V (step S14). If the differential voltage value is equal to or smaller than 9 V in step S14, the duty register value is set to be "3," i.e., "0011" in step S15. If, on the other hand, the differential voltage value is larger than 9 V in step S14, the duty register value is set to be "1," i.e., "0001" in step S16.

If the count value is not "0" in step S6 or if the processing of steps S9, S13, S15 or S16 has completed, then processing of step S17 is executed.

In step S17, it is determined whether or not the least significant bit (LSB) of the duty register is "1." If the least significant bit is "1" in step S17, a control signal to execute the trickle charge is produced in step S19. The control signal used for turning on the FET switch 73 is output from the output port 55 to the FET switch 73. Accordingly, a trickle charge current is supplied from the AC adapter 29 to the battery 48 through the trickle charge resistor 66, thus starting the trickle charge.

If the least significant bit of the duty register is not "1" but "0" in step S17, a control signal to stop the trickle charge is produced in step S18. The control signal for turning off the FET switch 73 is supplied from the output port 55 to the FET switch 73. Accordingly, the AC adapter 29 is prevented from supplying the trickle charge current to the battery 48, thus stopping the trickle charge.

In step S20, one bit rotation is executed for the duty register, so that the duty register value of the duty register is rotated to the right by one bit.

In step S21, the count value of the counter is incremented by 1. As mentioned above, the count value is repeatedly counted up in the order of "0," "1," "2" and "3." Therefore, if the counter value is "3 ," it is set to be "0" in step S21. Thereafter, the processing flow returns to step S3, so that the trickle charge control mentioned above is performed every period of 65 ms.

A description will now be given, with reference to FIG. 6, in changes of a count value and a duty register value during the trickle charge control. FIG. 6 shows the case where a hexadecimal number of "3" (i.e., "0011") is set as the duty register value. It should be noted that the count value is incremented by 1 every the period of 65 ms.

As may be understood from FIG. 6, when the count value of the counter is "0," it is determined in step S17 that the least significant bit of the duty register is "1." Therefore, the trickle charge is continued (step S19). In step S20, the duty register value "0011" is changed to "1001" by one bit rotation to the right, and in step S21, the count value "0" is incremented by 1, thereby to obtain "1."

After 65 ms elapses, the count value of the counter is "1," it is determined in step S17 that the least significant bit of the duty register is "1." In this case, the trickle charge is continued (step S19). The duty register value "1001" is changed to "1100" by one bit rotation to the right, and the count value "1" is incremented by 1, thereby to obtain "2."

After a further 65 ms elapses (i.e., after 130 ms elapses from the start of the trickle charge control), the count value of the counter is "2," it is determined in step S17 that the least significant bit of the duty register is "0." In this case, the trickle charge is stopped (step S18 ). The duty register value "1100" is changed to "0110" by one bit rotation to the right, and the count value "2" is incremented by 1, thereby to obtain "3."

After a further 65 ms elapses (i.e., after 195 ms elapses from the start of the trickle charge control), the count value of the counter is "3," it is determined in step S17 that the least significant bit of the duty register is "0". In this case, stopping of the trickle charge is continued (step S18). The duty register value "0110" is changed to "0011" by one bit rotation to the right, and the count value "3" is changed to "0" by increment of the count value.

After a further 65 ms elapses (i.e., after 260 ms elapses from the start of the trickle charge control), it is determined in step S6 that the count value of the counter is "0." Therefore, steps S7-S16 are executed, wherein a new duty register value is set in the register and the trickle charge control is executed in accordance with the new duty register value.

According to the present invention, when the AC adapter is connected to the computer system, trickle charge is started or stopped at the predetermined timings based on a differential voltage. Even when the differential voltage increases, a trickle charge current is close to the desirable value "It" at all times, as is indicated by the bent line A in FIG. 3. Since the wattage of the trickle charge resistor 66 need not be large (1 W in the case of the present embodiment), the resistor 66 of a small size can be used.

In the above embodiment, the trickle charge is started or stopped at intervals set on the basis of the differential voltage representing the difference between the adapter voltage and the battery voltage. However, the present invention is not limited to this. The trickle charge can be started or stopped either in multi-steps or linearly on the basis of the differential voltage.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A power supply controlling apparatus comprising:
   a chargeable battery;
   supply means for supplying a trickle charge current to the battery; and
   control means including a central processing unit (CPU) for sampling voltages of the battery and the supply means at predetermined times during trickle charge of the battery, for determining a differential voltage representing a difference between the voltages of the battery and the supply means, for setting a trickle charge execution period and a trickle charge stop period within a predetermined period on the basis of a determined differential voltage value, and for causing the supply means to supply the trickle charge current to the battery controllably in accordance with the set trickle charge execution period and trickle charge stop period.

2. The apparatus according to claim 1, wherein said control means further comprises means for determining when the differential voltage value is equal to or smaller than a first set value, and, if so, setting only the trickle charge execution period within the predetermined period, and continuing the trickle charge during the predetermined period.

3. The apparatus according to claim 2, wherein said control means further comprises means for determining when the differential voltage value is larger than the first set value and equal to or smaller than a second set value, and, if so, setting the trickle charge execution period to coincide with the trickle charge stop period.

4. The apparatus according to claim 1, wherein said control means further comprises means for determining when the differential voltage value is larger than a second set value, and, if so, setting the trickle charge execution period to be ⅓ of the trickle charge stop period.

5. A power supply controlling method comprising the steps of:
   determining whether or not a battery is incorporated and whether or not an adapter for supplying a trickle charge current is connected, the battery being chargeable;
   starting trickle charge of the battery when the battery is incorporated and the adapter is connected;
   sampling voltages of the battery and the adapter at a predetermined time during the trickle charge of the battery;
   determining the differential voltage representing a difference between the sampled voltages of the battery and the adapter at each sampling;
   setting a trickle charge execution period and a trickle charge stop period within a predetermined period on the basis of the determined differential voltage; and
   causing the adapter to supply the trickle charge current to the battery controllably in accordance with the set trickle charge execution period and trickle charge stop period.

6. The method according to claim 5, wherein when the differential voltage value is equal to or smaller than a first set value, said setting step comprises setting only the trickle charge execution period within the predetermined period, and said adapter is caused to continue the trickle charge during the predetermined period.

7. The method according to claim 6, wherein when the differential voltage value is larger than the first set value and is equal to or smaller than a second set value, said setting step comprises setting the trickle charge execution period to coincide within the trickle charge stop period set.

8. The method according to claim 5, wherein the differential voltage value is larger than a second set value, said setting step comprises setting the trickle charge execution period to be ⅓ of the trickle charge stop period.

9. A power supply controlling apparatus, comprising:
   a rechargeable battery;
   a current source for supplying a trickle charge current to the battery; and
   control means, including a central processing unit (CPU) and storage means for storing data indicating execution and inhibition of a trickle charge, for sampling a voltage of the rechargeable battery and a voltage of the current source, obtaining a difference between the sampled voltage of the rechargeable battery and the sampled voltage of the current source, comprising the difference voltage with a threshold value, and for setting in the storage means data indicating execution or inhibition of the trickle charge over a plurality of predetermined periods in accordance with a comparison result, and for controlling the trickle charge in accordance with the contents of the storage means.

10. The apparatus according to claim 9, further comprising a counter means for counting the plurality of predetermined periods, wherein the data set in the storage means correspond to the respective predetermined periods and the control means controls the execution and inhibition of the trickle charge in accordance with the counter and the data set in the storage means.

11. The apparatus according to claim 9, wherein the storage means is a register constituted by a plurality of bits, which correspond to respective of the predetermined periods and indicate the execution or inhibition of the trickle charge, and wherein each time the counter counts, the bits constituting the register are rotated.

12. A power supply controlling method in a computer driven by one of a rechargeable battery and an AC adapter for charging the rechargeable battery, the method comprising the steps of:
   a) sampling a voltage of the battery and a voltage of the AC adapter;
   b) obtaining a difference voltage between the sampled battery voltage and the sampled AC adapter voltage;
   c) comparing the difference voltage with a threshold value;
   d) setting in a register data indicating execution or inhibition of a trickle charge over a plurality of predetermined periods in accordance with a comparison result obtained from the comparing step; and e) controlling the trickle charge in accordance with the contents of the storage means.

13. A power supply controlling apparatus, comprising:

a rechargeable battery;

a current source for supplying a trickle charge current to the battery;

means for storing data indicating execution and inhibition of a trickle charge;

sampling means for sampling a voltage of the rechargeable battery and a voltage of the current source;

obtaining means for obtaining a difference between the sampled voltage of the rechargeable battery and the sampled voltage of the current source;

comparing means for comparing the difference voltage with a threshold value;

setting means for setting in the storage means data indicating execution or inhibition of the trickle charge over a plurality of predetermined periods in accordance with a comparison result; and a controller for controlling the trickle charge in accordance with the contents of the storage means.

14. The apparatus according to claim 13, further comprising a counter means for counting the plurality of predetermined periods and the data set in the storage means correspond to the respective predetermined periods and the control means controls the execution and inhibition of the trickle charge in accordance with the counter and the data sat in the storage means.

15. The apparatus according to claim 13, wherein the storage means is a register constituted by a plurality of bits, which correspond to respective of the predetermined periods and indicate the execution or inhibition of the trickle charge, and each time the counter counts, the bits constituting the register are rotated.

16. A computer system comprising:

a rechargeable battery;

an AC adapter supplying an external power to the battery to charge the battery;

a first voltage detector detecting a first voltage of the battery;

a second adapter detector detecting a second voltage of the AC adapter;

a memory storing data indicating execution period of a trickle charge;

trickle charge means for supplying a trickle charge current from the AC adapter to the battery;

sampling means for sampling the first and the second voltages detected by the first and second voltage detectors at predetermined times during the trickle charge means supplying the trickle charge current to the battery;

determining means for determining a differential voltage representing a difference between the first and the second voltages;

setting means for setting in the memory data indicating a trickle charge execution period within a predetermined period in accordance with the differential voltage determined by the determining means; and control means for controlling the trickle charge means in accordance with the execution period set by the setting means.

* * * * *